(12) United States Patent
Bell et al.

(10) Patent No.: US 7,997,361 B1
(45) Date of Patent: Aug. 16, 2011

(54) REVERSE DRIVE MECHANISM FOR WHEELED DEVICES

(76) Inventors: David Anthony Bell, Cadiz, KY (US);
LaNell Easley Bell, Cadiz, KY (US)

( * ) Notice: Subject to any disclaimer, the term of this patent is extended or adjusted under 35 U.S.C. 154(b) by 77 days.

(21) Appl. No.: 12/287,588

(22) Filed: Oct. 10, 2008

Related U.S. Application Data

(60) Provisional application No. 60/998,356, filed on Oct. 11, 2007.

(51) Int. Cl.
*B62D 49/06* (2006.01)
(52) U.S. Cl. ............. 180/11; 180/12; 180/13; 180/14.2; 180/14.7; 180/14.3; 180/16
(58) Field of Classification Search ............. 180/11, 180/12, 13, 14.2, 14.7, 14.3, 16
See application file for complete search history.

(56) References Cited

U.S. PATENT DOCUMENTS

| | | | |
|---|---|---|---|
| 4,210,217 A * | 7/1980 | Lachowicz | 180/13 |
| 4,580,652 A * | 4/1986 | Turner et al. | 180/210 |
| 4,961,477 A * | 10/1990 | Sweeney | 180/219 |
| 6,766,871 B2 * | 7/2004 | Sawyer | 180/13 |
| 6,945,343 B1 * | 9/2005 | Moreau et al. | 180/13 |
| 6,991,050 B1 * | 1/2006 | Sanford et al. | 180/13 |
| 7,328,761 B1 * | 2/2008 | Tyler | 180/13 |
| 7,451,841 B2 * | 11/2008 | Nelson | 180/13 |
| 2005/0023050 A1 * | 2/2005 | Chidlow et al. | 180/11 |
| 2007/0131461 A1 * | 6/2007 | Treadwell et al. | 180/19.1 |

* cited by examiner

*Primary Examiner* — Paul N Dickson
*Assistant Examiner* — Marlon Arce
(74) *Attorney, Agent, or Firm* — Stockwell & Smedley, PSC

(57) ABSTRACT

A reverse drive mechanism is configured to rotate at least one wheel of a multi-wheeled device in a reverse direction so that the device moves in that reverse direction. One particular application involves a motorcycle conversion assembly in which at least one of the rear wheels of the conversion assembly is driven in the reverse direction so as to back-up the motorcycle.

13 Claims, 7 Drawing Sheets

REVERSE DRIVE MECHANISM FOR WHEELED DEVICES

CROSS-REFERENCE TO RELATED APPLICATIONS

This application claims priority to U.S. Provisional Patent Application 60/998,356 filed Oct. 11, 2007, the disclosure of which is hereby incorporated by reference in its entirety.

BACKGROUND OF THE INVENTION

1. Field of the Invention

Embodiments of the present invention relate generally to wheeled devices and, more particularly, to a reverse drive mechanism for wheeled devices.

2. Description of Related Art

Motorcycles have been used as a means of automotive transportation and as a means of recreation for many years; and throughout much of that time, people have modified the conventional two wheel motorcycle structure to provide supplementary wheels for additional stability, increased cargo capacity, and other reasons. One of the earliest modifications involved the addition of a sidecar, which increased the carrying capacity and improved stability in some respects, so long as the motorcycle was traveling in essentially a straight line.

Another approach to modifying a motorcycle was to create a tricycle structure by removing the original rear wheel of the motorcycle and replacing it with a pair of rear wheels at each end of a rigid axle. The tricycle configuration is a significant improvement over the sidecar in terms of symmetry and straight line stability, but conventional tricycle designs have continued to experience problems and disadvantages. In the conventional tricycle structure the rigid rear axle is connected to an extension frame that is rigidly attached to the original motorcycle frame, making it critical for the extension frame and rear axle be correctly aligned in order to track properly as the motorcycle is driven.

Thus, many prior art conversion kits and assemblies for converting a two wheel motorcycle into a tricycle type vehicle have a number of disadvantages. Many of them require removal of the rear drive wheel of the motorcycle and connection of the drive mechanism to the wheels of the conversion assembly. Others require extensive connection of the conversion assembly to the motorcycle making it difficult, if not impractical, to change back for use as a conventional two wheel motorcycle.

One alternative approach, as disclosed in U.S. Pat. No. 6,612,389, includes a combination conversion assembly and trailer that can be used to haul the motorcycle and which also attaches to the rear of a motorcycle to provide stability. Such a conversion assembly can be easily attached without removing any of the wheels of the motorcycle. While the conversion assembly in the U.S. Pat. No. 6,612,389 addresses most of the shortcomings of alternative approaches, one remaining obstacle involves backing-up the motorcycle once the conversion assembly is attached. The disclosure of the U.S. Pat. No. 6,612,389 is hereby incorporated by reference in its entirety.

Many times conversion assemblies are initially considered by a motorcycle owner because the owner is uncomfortable riding the motorcycle on two wheels because of size, health, age, disability or some similar reason. Particularly for such riders, backing the motorcycle or maneuvering it in a tight space may prove difficult. Thus, there remains an unfulfilled need for a motorcycle conversion assembly that includes a reverse drive mechanism.

BRIEF SUMMARY OF THE INVENTION

Embodiments of the present invention relate to a reverse drive mechanism for a wheeled device. In particular, the reverse drive mechanism is configured to rotate at least one wheel of a multi-wheeled device in a reverse direction so that the device moves in that reverse direction. One particular embodiment involves a motorcycle conversion assembly in which at least one of the rear wheels of the conversion assembly is driven in the reverse direction so as to back-up the motorcycle.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings.

DETAILED DESCRIPTION OF INVENTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the written description below, a particular embodiment of the present invention is focused on to provide a concrete example of the principles contemplated in the present invention. That particular embodiment involves a conversion assembly for a motorcycle. However, the detailed description of this particular application of the invention is not intended to limit the present invention to only motorcycle conversion assemblies. One of ordinary skill will recognize that a reverse drive mechanism as described herein may also be used with other multi-wheeled devices such as carts, hand carts, hand trucks, wagons, vehicle trailers, recreational trailers, boat trailers, and similar devices.

Figure 1:
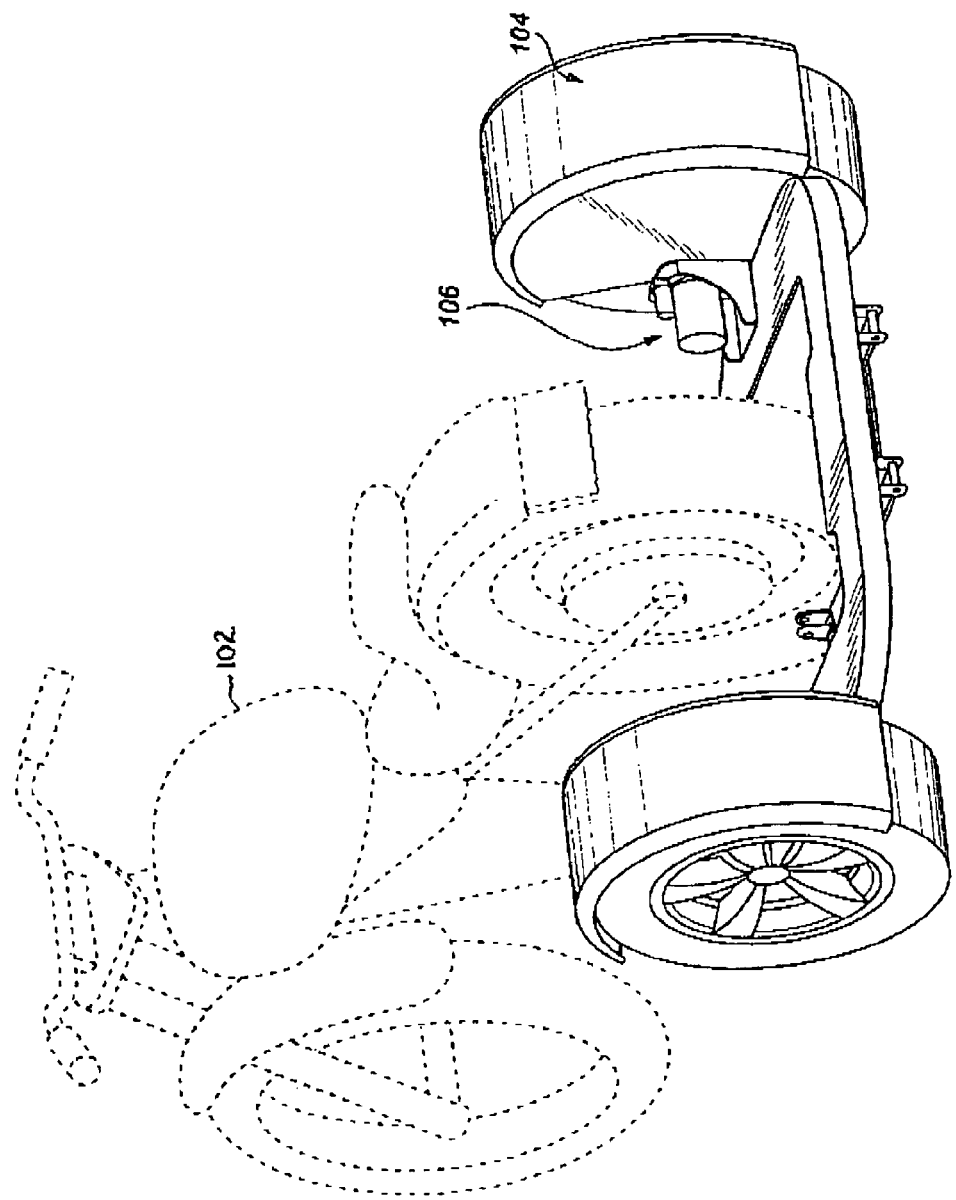
FIG. 1 illustrates a motorcycle coupled with a conversion assembly in accordance with the principles of the present invention.

FIG. 1 illustrates a motorcycle coupled with a conversion assembly in accordance with the principles of the present invention. Many aspects of the conversion assembly 104 for the motorcycle 102 is described within the previously incorporated U.S. Pat. No. 6,612,389. Briefly, the conversion assembly 104 comprises two wheels attached to a frame which itself is attached to the structural members of the motorcycle 102. The conversion assembly 104, in particular, may also double as a trailer for hauling the motorcycle 102. As described in the U.S. Pat. No. 6,612,389, the conversion assembly 104 can be coupled to the hitch of a vehicle and used to trailer the motorcycle 102. The conversion assembly 104 is then disconnected from the vehicle and configured to attach to the rear of the motorcycle. In this way, the conversion assembly 104 offers additional stability when connected to the motorcycle 102.

The conversion assembly 104 of FIG. 1, however, includes a reverse drive mechanism 106 that is coupled with at least one of the wheels of the conversion assembly 104. The reverse drive mechanism 106 may be assembled with the conversion assembly 104 or may be added later as a separate add-on item. The reverse drive mechanism 106 is configured to drive the wheel to which it is coupled in a direction so as to cause the motorcycle 102 and assembly 104 to back up. Thus, an operator of the motorcycle 102 can travel in a reverse direction under power, thereby alleviating the need to walk or push the motorcycle 102 in the reverse direction.

Figure 2:
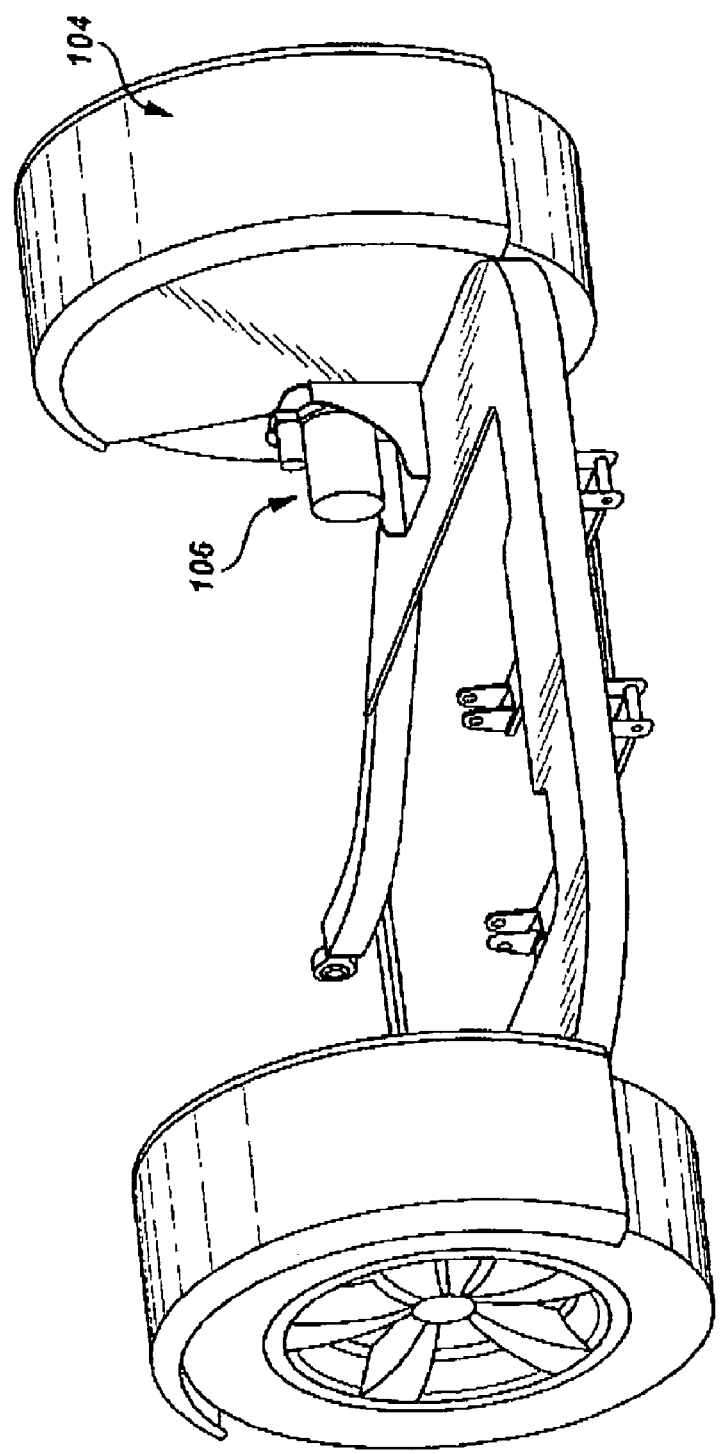
FIG. 2 illustrates a conversion assembly in accordance with the principles of the present invention.

FIG. 2 illustrates a conversion assembly in accordance with the principles of the present invention that includes a reverse drive mechanism. The motorcycle 102 has been omitted from FIG. 2 to more clearly illustrate an exemplary location for a reverse drive mechanism 106 in accordance with the principles of the present invention. Although the reverse drive mechanism 106 may be located in a number of locations and still operate as intended, the location in FIG. 2 is unobtrusive and provides a simple mechanical coupling between the reverse drive mechanism 106 and the wheel to which it is coupled. One of ordinary skill will recognize that the reverse drive mechanism 106 may instead be connected to the opposite wheel depicted in FIG. 2.

Additionally, although not shown, a separate reverse drive mechanism may be coupled to each of the wheels of the conversion assembly 104. In one embodiment, duplicate reverse drive mechanisms 106 may be respectively coupled to each wheel so that twice the amount of torque is applied when the reverse drive mechanisms are engaged. This embodiment may allow a smaller size motor to be used than in the single reverse drive mechanism embodiment shown in FIG. 2. Alternatively, distinct reverse drive mechanisms may be respectively coupled to each wheel. In this embodiment, each mechanism would have its own engagement device so that one or the other reverse drive mechanisms may be individually powered. By using different gear ratios in each of the distinct reverse drive mechanisms, different reverse-direction speeds may be accomplished.

Figure 3:
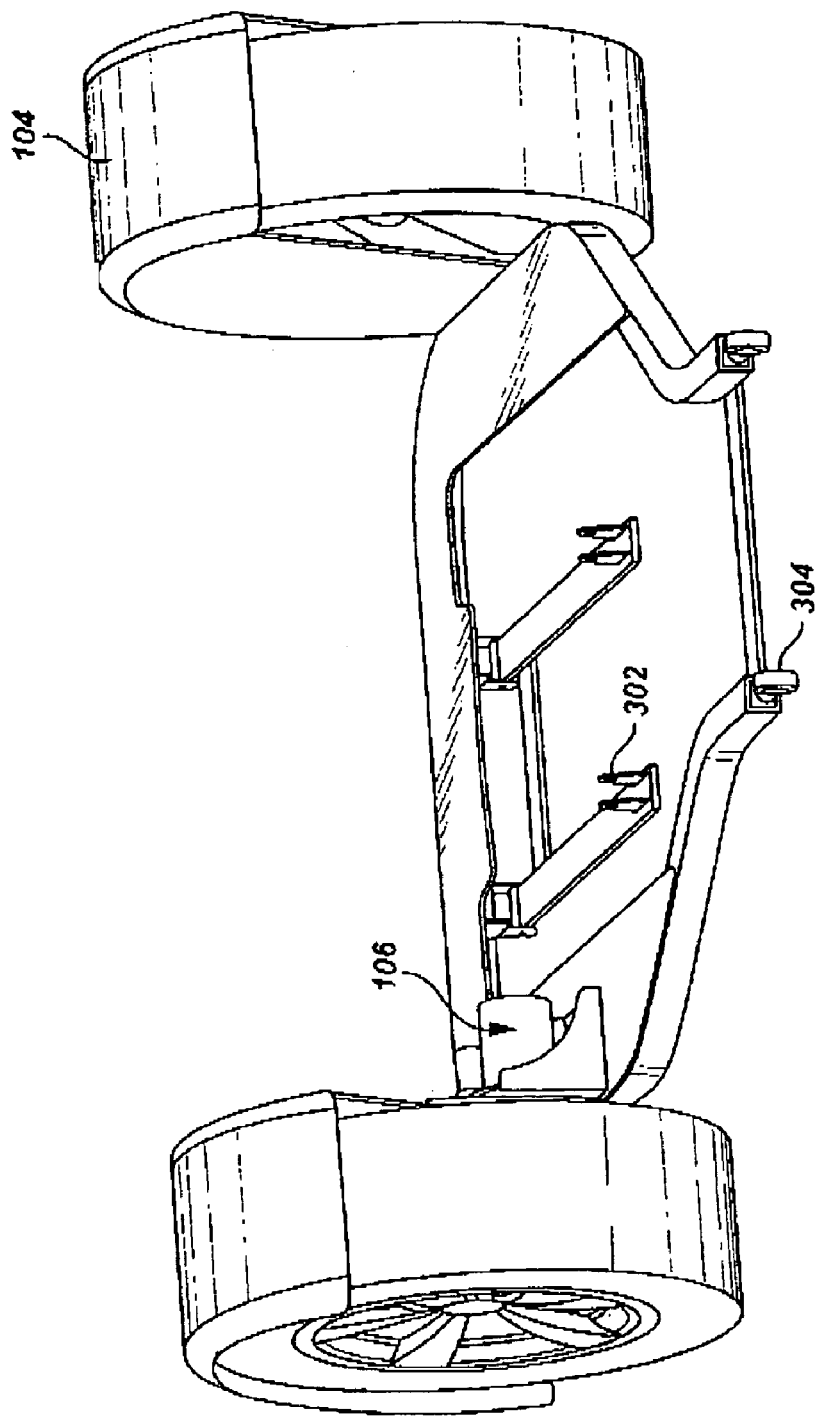
FIG. 3 illustrates another view of the conversion assembly of FIG. 2.

FIG. 3 illustrates another view of the conversion assembly of FIG. 2. From this view, the structure of the conversion assembly 104 may be appreciated. In particular, the robust mounting points for attaching the assembly 104 to the motorcycle may be clearly seen. One set of mounting points 302 attaches the assembly 104 to the rear axle of the motorcycle while the bushings 304 provide a robust and easy connection to the undercarriage of the motorcycle.

Figure 4:
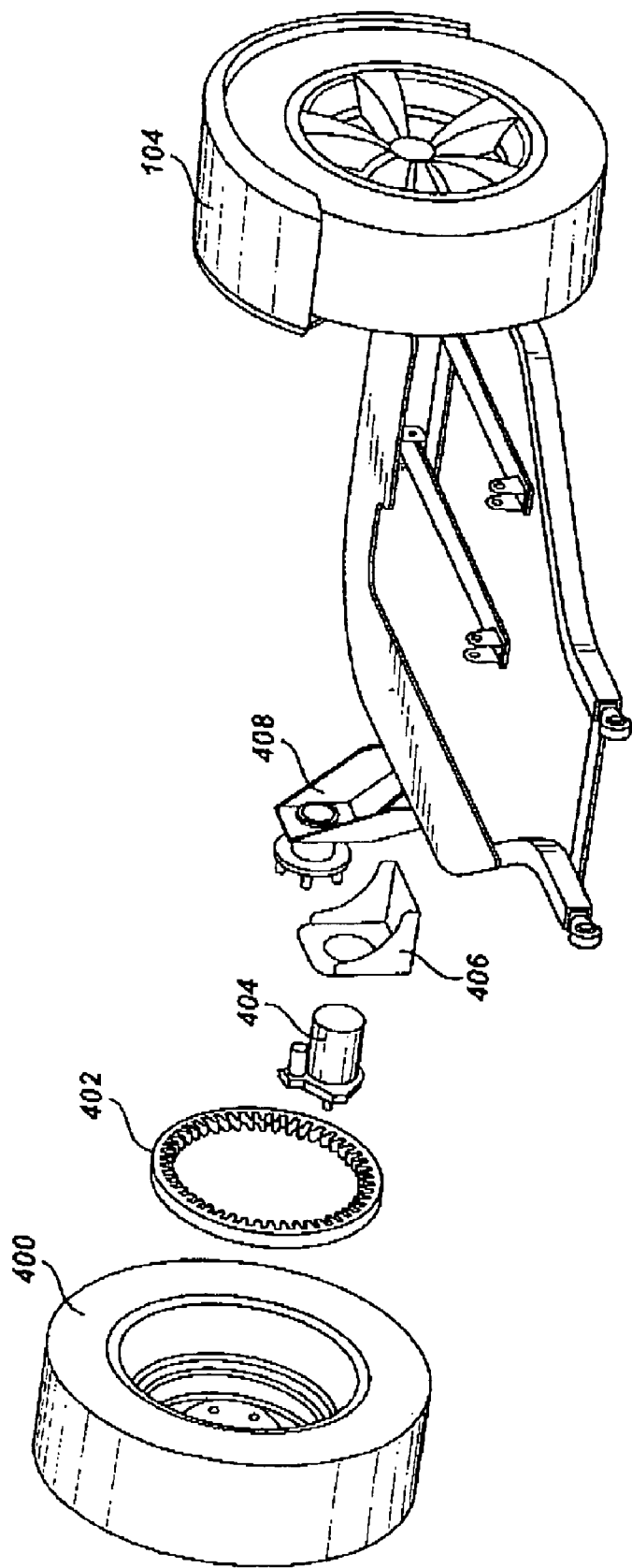
FIG. 4 illustrates an exploded view of the conversion assembly of FIG. 3.

FIG. 4 illustrates an exploded view of the conversion assembly of FIG. 3. From this illustration, the components of one exemplary reverse drive mechanism may be seen. The assembly 104 includes a hub 408 on which the wheel 400 is mounted. Coupled to the wheel 400, hub 408 or any portion thereof is a multi-toothed gear 402. Additionally, there is a bracket 406 that attaches to the frame of the assembly 104. On this bracket 406, a motor 404 is attached. When fully assembled, the motor 404 mechanically engages the gear 402 so as to cause the wheel 400 to rotate. In particular, the wheel 400 is caused to rotate in the reverse direction permitting the motorcycle to back up.

One of ordinary skill will recognize that there are many functionally equivalent methods for attaching these components to each other and their various mounting points. Either permanent fasteners (e.g., welding) or removable fasteners (e.g., nuts, bolts), or a combination of both, may be used without departing from the scope of the present invention.

Figure 5:
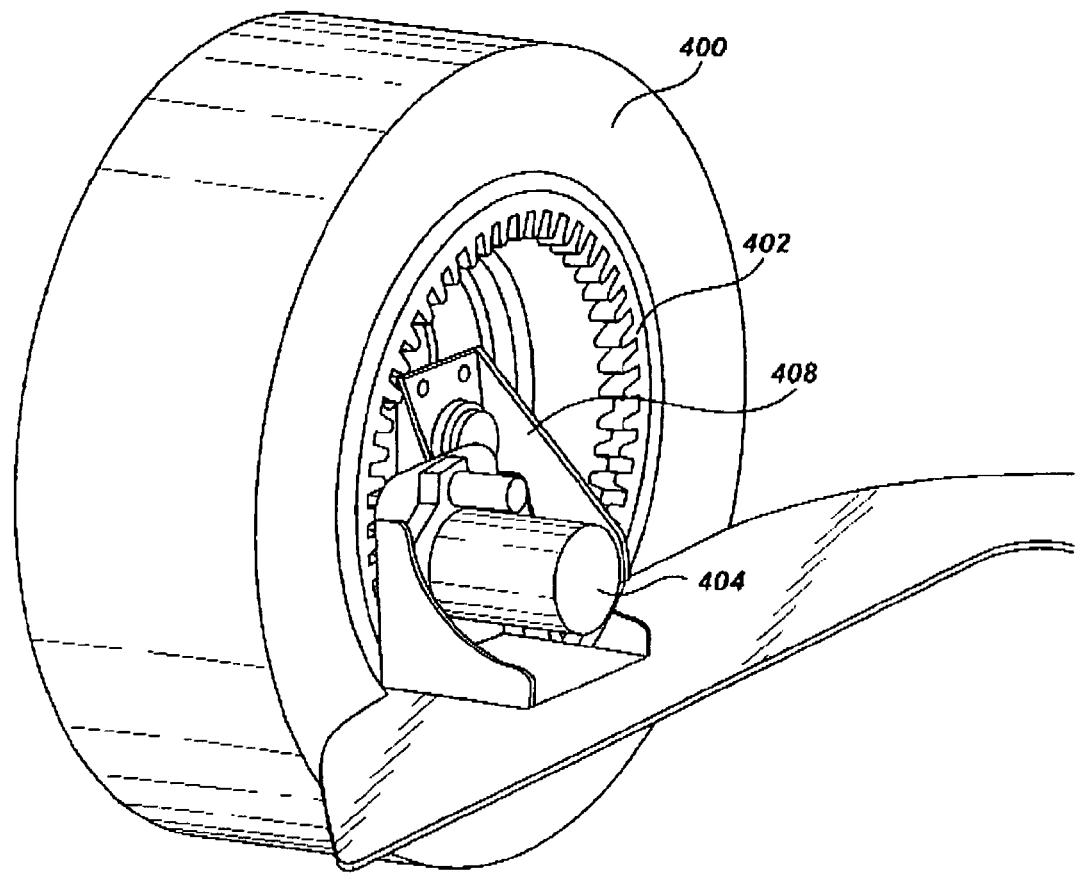
FIG. 5 illustrates a close up view of one of the wheels of the conversion assembly of FIG. 2.

FIG. 5 illustrates a close up view of one of the wheels of the conversion assembly of FIG. 2. As shown, when assembled, the motor 404 is mounted via the bracket 406 in close proximity to the gear 402 within the wheel 400.

Figure 6:
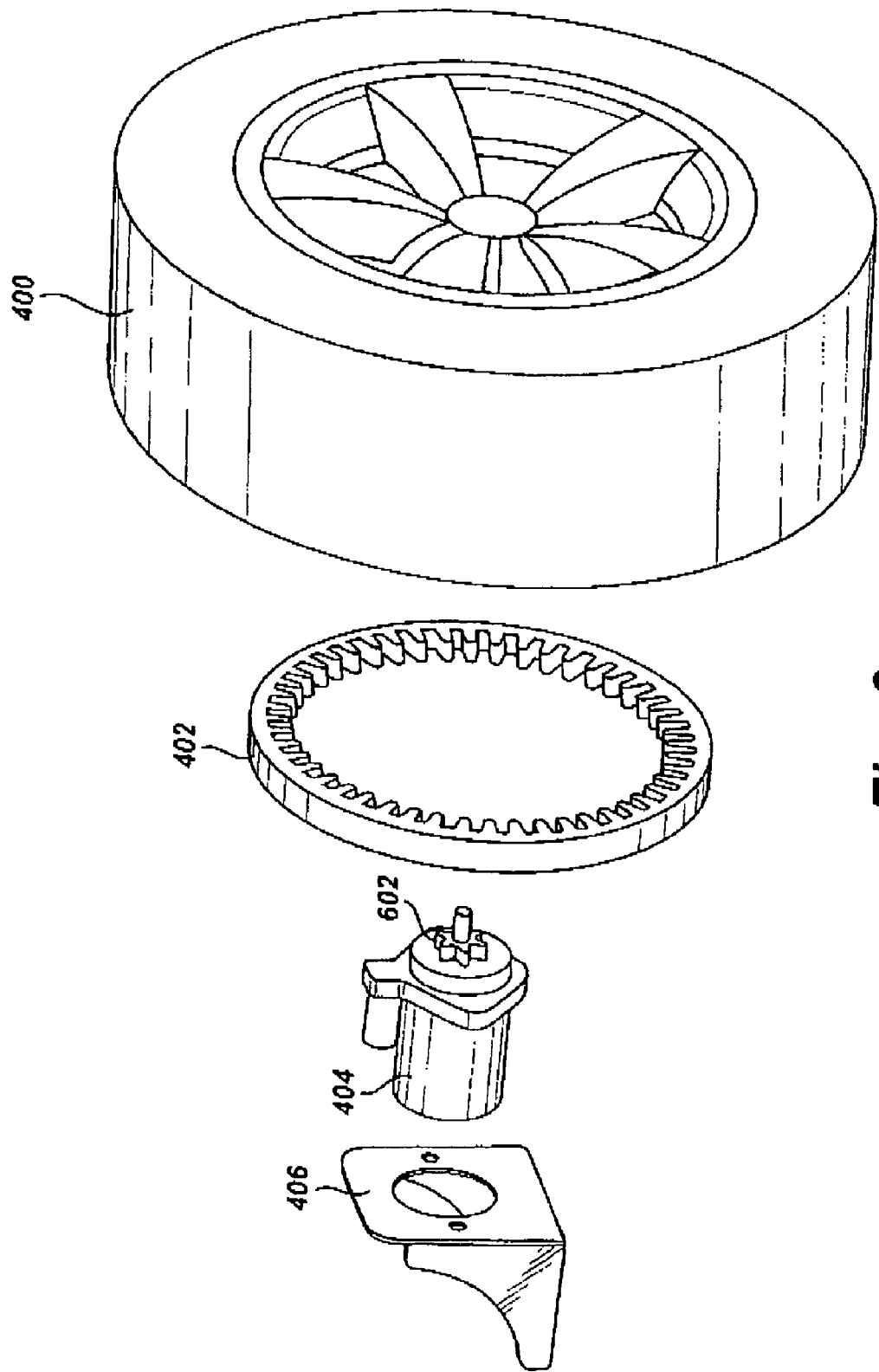
FIG. 6 shows an exploded view of a reverse drive mechanism in accordance with the principles of the present invention.

FIG. 6 shows an exploded view of a reverse drive mechanism in accordance with the principles of the present invention. In this opposite view from FIG. 4, a gear 602 can be seen that is attached to the shaft of the motor 404. This gear 602 has multiple teeth which are arranged to engage the teeth of the gear 402.

One exemplary motor 404 that may be used in embodiments of the present invention is an automotive-type starter motor in the range of between 10 and 20 HP. Such a motor conveniently engages the gear 402 when powered and then disengages when power is removed. One of ordinary skill will recognize that the gear ratios between the gear 602 and the gear 402 may be selected to provide a desired torque and speed to the wheel 400. In FIG. 6 the teeth of the gear 402 are located around its inside periphery; however, these teeth may alternatively be located around the outside periphery of the gear 402 without departing from the scope of the present invention.

Although only two gears are shown, it is contemplated that one or more intermediary gears may also be used, without departing from the scope of the present invention, to provide the desired torque and speed in an arrangement smaller than that described above.

Furthermore, although the reverse drive mechanism of FIGS. 2-6 is illustrated as having direct engagement between the motor 404 and the gear 402, one of ordinary skill will recognize that other mechanical couplings are possible such as a worm-drive screw arrangement or a belt-driven mechanism.

Figure 7:
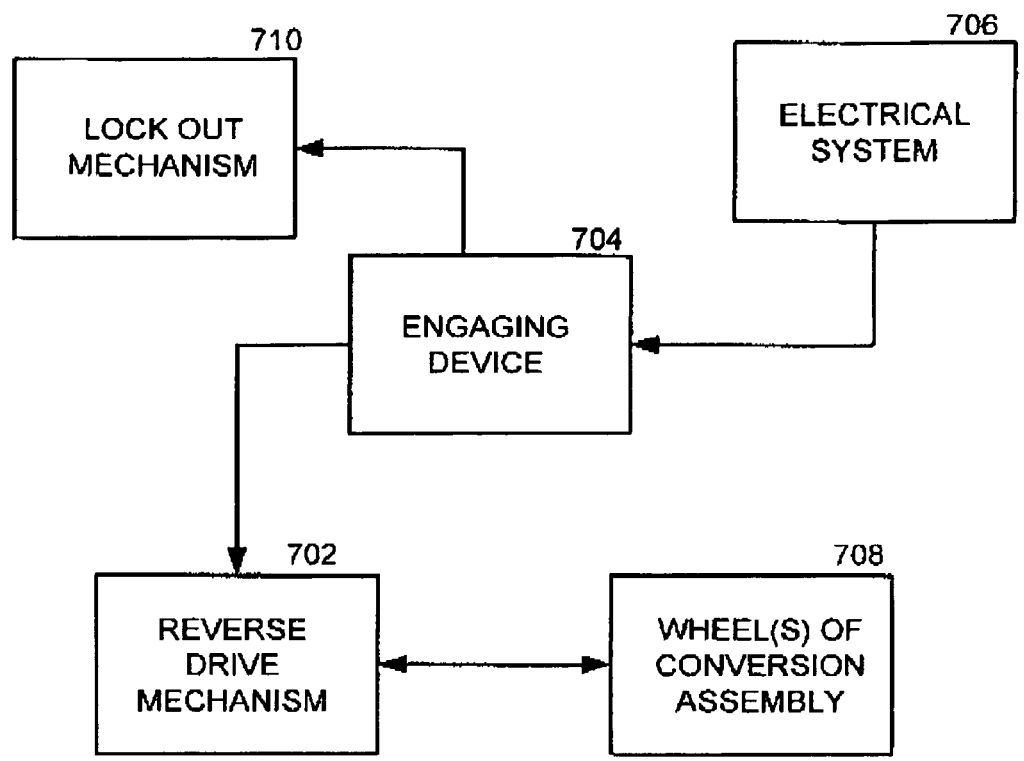
FIG. 7 illustrates a block diagram of a reverse drive mechanism in accordance with the principles of the present invention.

FIG. 7 illustrates a block diagram of a reverse drive mechanism in accordance with the principles of the present invention. The components of the reverse drive mechanism are shown in block form because one of ordinary skill will recognize that these components may be implemented in a number of functionally equivalent ways without departing from the scope of the present invention.

The reverse drive mechanism described herein may operate under electrical power supplied by either the motorcycle battery or by an auxiliary battery. Thus, there is an electrical system 706 that is electrically coupled with the reverse drive mechanism 702 to provide power. Because it is undesirable to have power continually supplied to the reverse drive mechanism 702, there is an engaging device 704 that controls when power is supplied to the reverse drive mechanism 702. In its simplest embodiment, the engaging device 704 is a mechanical or electrical switch that connects or disconnects power to the reverse drive mechanism 702. In an alternative embodiment, the reverse drive mechanism is a variable speed device such as a variable speed motor. In this embodiment the engaging device 704 controls the current or voltage applied to the variable speed motor so that the reverse drive mechanism operates at different speeds when being supplied with the varying levels of power.

When power is supplied to the reverse drive mechanism 702 it mechanically couples to at least one of the wheels of the conversion assembly 708 and rotates that wheel so that the conversion assembly (and the attached motorcycle) travels in the reverse direction. As discussed above, the mechanical coupling can be accomplished with any of a variety of gear-driven or belt-driven devices that are known to one of ordinary skill.

Because it is undesirable for the conversion assembly wheels 708 to be driven in a reverse direction while the motorcycle's transmission is in gear, a lockout mechanism 710 is contemplated. The lockout mechanism may be implemented in a variety of ways. For example, when the engaging device 704 is activated, the lockout mechanism 710 may be configured to prevent the motorcycle's transmission from being put in gear. Alternatively, the lockout means 710 may detect when the motorcycle is in gear and prevent the engaging device 704 from providing power to the reverse drive mechanism 702. An indicator or other warning device may be incorporated to alert the motorcycle operator to the reason the motorcycle will not go in gear or why the engaging device 704 appears to be non-operational.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein; but are to be accorded the full scope consistent with each claim's language, wherein reference to an element in the singular is not intended to mean "one and only one" unless specifically so stated but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A reverse drive mechanism for a multi-wheeled device, the multi-wheeled device having a front and a rear, the reverse drive mechanism comprising:
   a mechanical coupling between an electrical motor and at least one of the wheels of the multi-wheeled device;
   the electrical motor attached with the mechanical coupling configured to rotate the mechanical coupling, wherein the electrical motor is a variable speed motor capable of operating at least two different speeds when powered;
   an engagement mechanism configured to provide power to the electrical motor, wherein when power is provided, the electrical motor is configured to rotate the at least one of the wheels so that the multi-wheeled device travels towards the rear; and
   wherein the mechanical coupling includes:
      a first multi-toothed gear attached to the at least one wheel, wherein the first multi-toothed gear has teeth arranged around its inside periphery; and
      a second multi-toothed gear attached to the motor and is configured to engage the first multi-toothed gear.

2. The reverse drive mechanism of claim 1, wherein the electrical motor includes a starter motor.

3. The reverse drive mechanism of claim 1, wherein the engagement mechanism is configured to provide variable power to the electrical motor so as to operate the electrical motor at variable speeds.

4. The reverse drive mechanism of claim 1, wherein the multi-wheeled device includes a conversion assembly for a motorcycle including at least two wheels that are substantially the same size and positioned on opposite sides of the motorcycle from each other.

5. The reverse drive mechanism of claim 1, wherein the multi-wheeled device is one of: a hand cart, a dolly, a wagon, a vehicle trailer, and a boat trailer.

6. A conversion assembly for a motorcycle comprising:
   at least two wheels and a frame configured to attach to the motorcycle such that the at least two wheels are substantially the same size and positioned on opposite sides of the motorcycle from each other when attached to the motorcycle;
   a reverse drive mechanism configured to move the motorcycle in a reverse direction, wherein the reverse drive mechanism further comprises;
      a mechanical coupling between a motor and at least one of the wheels of the conversion assembly;
      the motor attached with the mechanical coupling configured to rotate the mechanical coupling; and
      an engagement mechanism configured to provide power to the motor, wherein when power is provided, the motor is configured to rotate the at least one of the wheels so that the motorcycle travels in the reverse direction.

7. The assembly of claim 6, wherein a battery of the motorcycle is electrically coupled to the engagement mechanism.

8. The assembly of claim 6, wherein the motor includes a starter motor.

9. The assembly of claim 6, wherein the mechanical coupling includes:
   a first multi-toothed gear attached to the at least one wheel; and
   a second multi-toothed gear attached to the motor and is configured to engage the first multi-toothed gear.

10. The assembly of claim 6, wherein the mechanical coupling includes a belt-drive mechanism.

11. The assembly of claim 6, further comprising:
   an auxiliary battery electrically coupled to the engagement mechanism.

12. The assembly of claim 6, further comprising:
   a lock out mechanism coupled with a transmission of the motorcycle configured to prevent the transmission from being in gear when the engagement mechanism is providing power to the motor.

13. A method of adapting a motorcycle conversion assembly comprising the steps of:
  attaching a reverse drive mechanism to the motorcycle conversion assembly, said assembly including a frame and at least two wheels that are substantially the same size and positioned on opposite sides of the motorcycle from each other when the conversion assembly is attached to the motorcycle; and wherein the reverse drive mechanism comprises:
    a mechanical coupling between a motor and at least one of the wheels of the motorcycle conversion assembly; the motor attached with the mechanical coupling configured to rotate the mechanical coupling; and
    an engagement mechanism configured to provide power to the motor; wherein when power is provided, the motor is configured to rotate the at least one of the wheels so that the motorcycle travels in a reverse direction.

* * * * *